United States Patent
Silorio et al.

(10) Patent No.: US 12,074,468 B2
(45) Date of Patent: *Aug. 27, 2024

(54) BATTERY CHARGER SYSTEM

(71) Applicant: CyberSwitchingPatents, LLC, San Jose, CA (US)

(72) Inventors: Ron Silorio, Pittsburg, CA (US); Charles Henry Reynolds, Morgan Hill, CA (US); Ximing Shi, Fremont, CA (US)

(73) Assignee: CyberSwitchingPatents, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/496,314

(22) Filed: Oct. 27, 2023

(65) Prior Publication Data

US 2024/0063650 A1    Feb. 22, 2024

Related U.S. Application Data

(63) Continuation of application No. 17/330,185, filed on May 25, 2021, now Pat. No. 11,837,905.

(51) Int. Cl.
*H02J 7/00* (2006.01)

(52) U.S. Cl.
CPC ........ *H02J 7/00714* (2020.01); *H02J 7/0013* (2013.01); *H02J 7/0047* (2013.01)

(58) Field of Classification Search
None
See application file for complete search history.

(56) References Cited

U.S. PATENT DOCUMENTS

| | | | | |
|---|---|---|---|---|
| 5,028,859 | A * | 7/1991 | Johnson | H02J 7/0024 320/DIG. 19 |
| 7,816,886 | B2 * | 10/2010 | Brandon, II | H02J 7/0042 320/112 |
| 8,181,043 | B1 * | 5/2012 | Reynolds | H04L 12/12 361/679.01 |
| 9,610,844 | B2 * | 4/2017 | Cho | B60R 16/03 |
| 10,623,328 | B1 * | 4/2020 | Balachandran | H04L 47/6275 |
| 10,862,811 | B1 * | 12/2020 | Balachandran | H04L 43/0852 |
| 11,865,935 | B2 * | 1/2024 | Chan | B60L 53/65 |
| 2002/0057205 | A1 * | 5/2002 | Reynolds | G06F 1/266 340/693.1 |

(Continued)

*Primary Examiner* — Drew A Dunn
*Assistant Examiner* — Tynese V McDaniel
(74) *Attorney, Agent, or Firm* — INNOVATION CAPITAL LAW GROUP, LLP; Vic Lin

(57) ABSTRACT

A battery charger system includes multiple power channels to accommodate multiple battery chargers through a power input port. Each power channel includes a power outlet electrically coupled to the power input port through a relay. Each power channel further includes a current sensor. A controller is configured to estimate current in each of the power channels using the sensor signals, and configured to control the relays. The battery charger system is configured to provide power to the outlets by closing the corresponding relays, until the total current estimate is more than a maximum current limit, at which point the controller is configured to open the most recently closed relay. The controller is further configured to sequentially close remaining relays after the total current drops sufficiently, while maintaining the total current below the maximum current limit.

19 Claims, 8 Drawing Sheets

(56) References Cited

U.S. PATENT DOCUMENTS

| | | | |
|---|---|---|---|
| 2002/0057206 A1* | 5/2002 | Reynolds | G06F 1/266 340/3.1 |
| 2004/0047095 A1* | 3/2004 | Reynolds | H04L 12/10 361/62 |
| 2004/0064198 A1* | 4/2004 | Reynolds | G06F 1/266 700/286 |
| 2006/0028178 A1* | 2/2006 | Hobbs | B60L 8/003 320/128 |
| 2008/0019067 A1* | 1/2008 | Reynolds | G06F 1/266 361/93.1 |
| 2008/0019068 A1* | 1/2008 | Reynolds | G06F 1/266 361/93.1 |
| 2010/0213892 A1* | 8/2010 | DeSanctis | H02J 7/0044 320/107 |
| 2013/0100567 A1* | 4/2013 | Reynolds | H02H 3/08 361/93.1 |
| 2014/0254050 A1* | 9/2014 | Haines | H02H 3/16 361/42 |
| 2016/0218536 A1* | 7/2016 | Caren | H02J 7/0042 |
| 2016/0362012 A1* | 12/2016 | Yao | H02J 7/0042 |
| 2017/0033566 A1* | 2/2017 | Jursch | H02J 1/10 |
| 2017/0158067 A1* | 6/2017 | Reynolds | B60L 53/305 |
| 2017/0158071 A1* | 6/2017 | Reynolds | B60L 53/305 |
| 2017/0158075 A1* | 6/2017 | Reynolds | B60L 53/63 |
| 2017/0299215 A1* | 10/2017 | Li | F24F 11/58 |
| 2018/0111493 A1* | 4/2018 | Chan | G01R 19/10 |
| 2018/0145378 A1* | 5/2018 | Fujita | H02J 7/0016 |
| 2018/0316199 A1* | 11/2018 | Lyons | H02J 7/0019 |
| 2019/0049036 A1* | 2/2019 | Narita | H02J 7/0013 |
| 2019/0070970 A1* | 3/2019 | Chan | B60L 53/65 |
| 2019/0157872 A1* | 5/2019 | Taimela | H02J 3/381 |
| 2020/0152934 A1* | 5/2020 | O'Neil | H01M 50/583 |
| 2020/0169081 A1* | 5/2020 | Yasoshima | H02J 1/102 |
| 2020/0169082 A1* | 5/2020 | Yasoshima | H02J 7/0069 |
| 2020/0386822 A1* | 12/2020 | Weiss | G01R 31/367 |
| 2021/0098946 A1* | 4/2021 | Davis | H02J 7/00 |
| 2021/0280029 A1* | 9/2021 | Gruber | G08B 13/19634 |
| 2021/0376620 A1* | 12/2021 | Fan | H02J 7/0013 |
| 2021/0376645 A1* | 12/2021 | Fan | H02J 7/0013 |
| 2022/0146586 A1* | 5/2022 | Kang | G01R 31/3842 |
| 2022/0239113 A1* | 7/2022 | Tian | H02J 7/00032 |
| 2022/0247316 A1* | 8/2022 | Jiang | H02M 3/1584 |
| 2022/0247317 A1* | 8/2022 | Jiang | H02M 3/1584 |
| 2022/0285949 A1* | 9/2022 | Kuranuki | H02J 7/00304 |

* cited by examiner

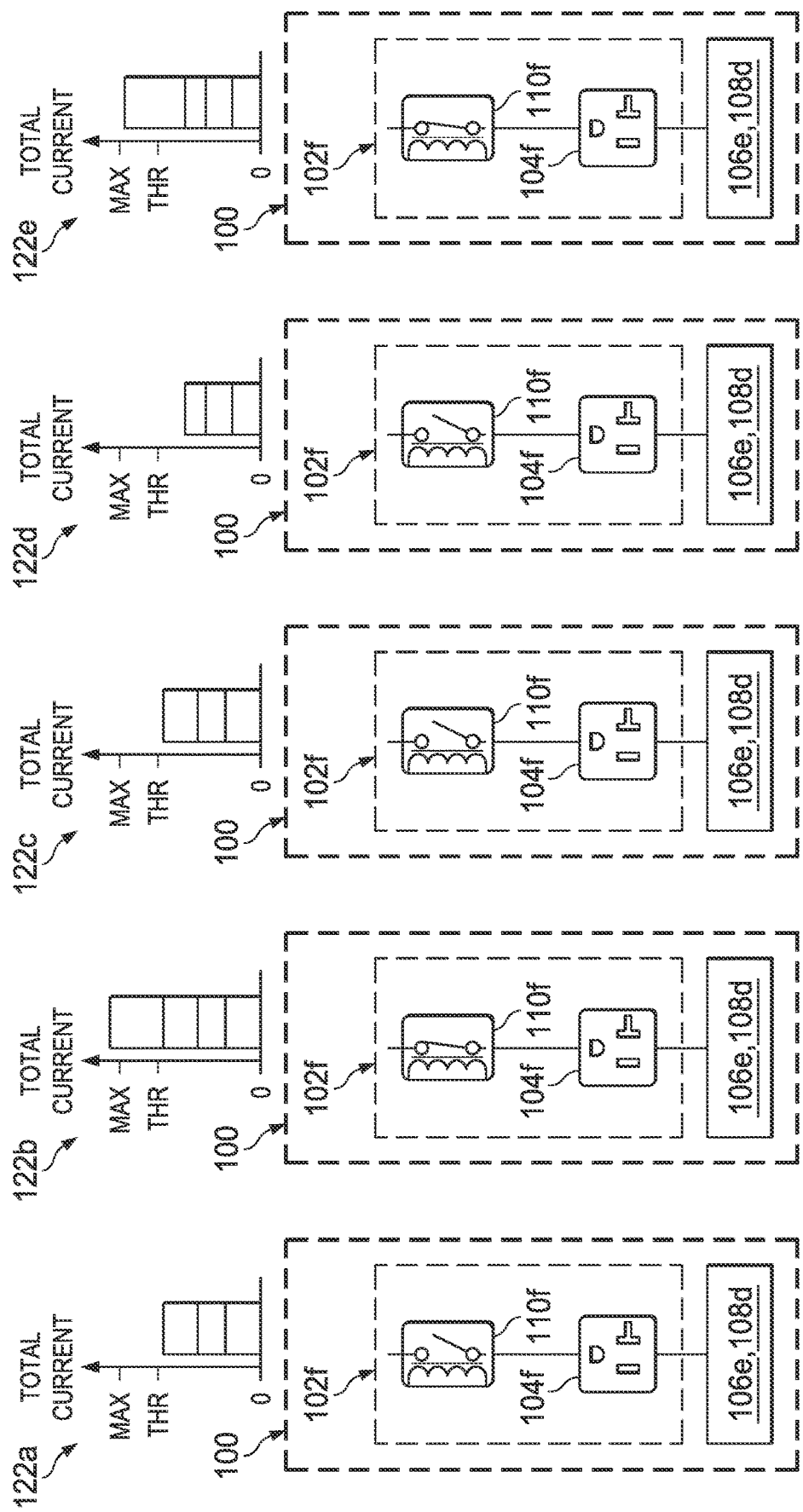

BATTERY CHARGER SYSTEM

CROSS-REFERENCE TO RELATED APPLICATIONS

This application is a continuation of U.S. patent application Ser. No. 17/330,185, filed May 25, 2021, the contents of which are herein incorporated by reference.

FIELD

This disclosure relates to the field of battery charger systems. More particularly, but not exclusively, this disclosure relates to battery charger systems for multiple battery chargers.

BACKGROUND

Rechargeable batteries for tools and landscape equipment have proliferated in recent years. It is common for small businesses and individuals to have multiple rechargeable batteries for a variety of tools and equipment. Widely used batteries range in operating potential from 5 volts to 56 volts, and higher voltages are expected in future batteries. Similarly, the batteries range in capacity from 1 amp-hour to 30 amp-hours, and higher capacity batteries are expected. Batteries from different manufacturers and batteries having different operating potentials, usually require different chargers. Charging multiple batteries can present challenges, as concurrent charging of multiple batteries can easily exceed the current capacity of an outlet. Sequential charging of batteries having different designs requires operator action to disconnect charged batteries and connect uncharged batteries.

SUMMARY

The present disclosure introduces a battery charger system that includes multiple power channels to accommodate multiple battery chargers. The battery charger system has a power input port. Each power channel includes a power outlet electrically coupled to the power input port through a relay. Each power channel further includes a current sensor which provides a sensor signal characteristic of current in the power channel. The relays and the current sensors are coupled to a controller, which is configured to estimate current in each of the power channels using the sensor signals, and configured to control the relays.

The battery charger system is configured to provide power to the outlets by closing the corresponding relays, until a total current estimate is more than a maximum current limit, at which point the controller is configured to open the most recently closed relay. The controller is further configured to subsequently close that relay after the total current estimate drops sufficiently. The controller is configured to provide power to all the outlets in turn, while maintaining the total current estimate below the maximum current limit.

BRIEF DESCRIPTION OF THE VIEWS OF THE DRAWINGS

FIG. 2A through FIG. 2E schematically depict an aspect of an example method of the battery charger system providing power to a battery charger.

DETAILED DESCRIPTION

The present disclosure is described with reference to the attached figures. The figures are not drawn to scale and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

A battery charger system is configured to provide power to multiple battery chargers while maintaining total current to the battery chargers below a maximum current limit. The maximum current limit may be set to avoid tripping a circuit breaker through which the battery charger system is powered. Commonly used circuit breakers for battery chargers have trip currents of 15 amps to 20 amps, and the maximum current limit is 70 percent to 90 percent of the trip current. The maximum current limit may be preset in a memory of the battery charger system. Alternatively, the maximum current limit may be updated by a user of the battery charger system, by a network connected to the battery charger system, or by other methods. Battery chargers commonly require a significant fraction of the maximum current limit, for example, 2 amps to 5 amps, when a battery begins charging, and require less current as charging of the battery progresses, culminating in a low current, for example less than 1 amp, when the battery is fully charged. The multiple battery chargers connected to the battery charger system may have a combined current draw that would exceed the maximum current limit if all the battery chargers started charging their batteries concurrently. The battery charger system is configured to maintain the total current below the maximum current limit by providing power to a subset of the battery chargers at any instant. When power is provided to a battery charger, resulting in the total current exceeding the maximum current limit, power is disconnected from the most recently powered battery charger, and power is restored to the disconnected battery charger when the total current drops below a threshold current limit. The threshold current limit is less than the maximum current limit by several amps. As batteries connected to the battery chargers become fully charged, current to those battery chargers lessens, and power is subsequently provided to remaining battery chargers, while maintaining total current below the maximum current limit.

Figure 1:
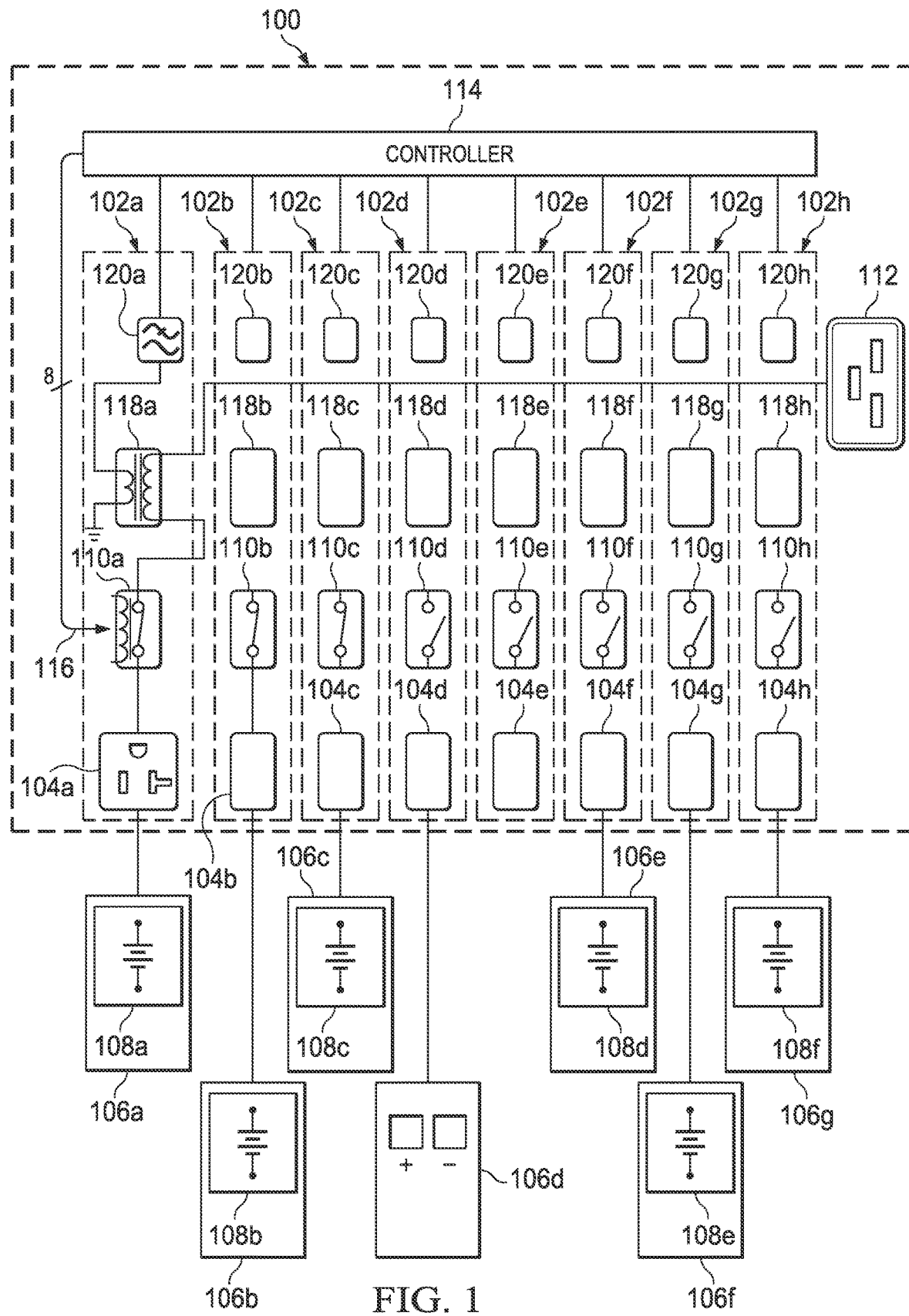
FIG. 1 depicts an example battery charger system, with multiple battery chargers connected to the battery charger system.

FIG. 1 depicts an example battery charger system, with multiple battery chargers connected to the battery charger system. The battery charger system 100 includes multiple power channels 102*a* through 102*h*. The battery charger system 100 of this example is depicted having eight of the power channels 102a through 102h, however, other example battery charger systems having more or fewer power channels are within the scope of this disclosure. Each of the power channels 102a through 102h includes a power outlet 104a through 104h. During operation of the battery charger system 100, the battery chargers 106a through 106g are plugged into the power outlets 104a through 104h. One or more of the power outlets 104a through 104h may be unconnected to a battery charger, as depicted in FIG. 1 for power outlet 104e. Alternatively, all of the power outlets 104a through 104h may be connected to battery chargers. Batteries 108a through 108e are mounted on the battery chargers 106a, 106b, 106c, 106e, 106f, and 106g for recharging. One or more of the battery chargers 106a through 106g may be free of a battery, as depicted in FIG. 1 for battery charger 106d. Alternatively, each of the battery chargers 106a through 106g may have a battery mounted on it.

Each of the power channels 102a through 102h includes a relay 110a through 110h, respectively, in series with the corresponding power outlet 104a through 104h. The battery charger system 100 has a power input port 112 connected to each of the power outlet 104a through 104h through the respective relays 110a through 110h. Each of the relays 110a through 110h is operational for being configured in an ON state which enables current to flow from the power input port 112 to the respective power outlet 104a through 104h during operation of the battery charger system 100; each of the relays 110a through 110h is further operational for being configured in OFF state which prevents current from flowing from the power input port 112 to the respective power outlet 104a through 104h during operation of the battery charger system 100. The relays 110a through 110h may be manifested as electro-mechanical relays or solid state relays, for example. FIG. 1 schematically depicts relays 110a through 110c in the ON state, and relays 110d through 110h in the OFF state.

The battery charger system 100 has a controller 114 which is configured to provide ON state signals individually to the relays 110a through 110h, which causes the relays 110a through 110h receiving the ON state signals to be configured in the ON state, during operation of the battery charger system 100. The controller 114 is further configured to provide OFF state signals individually to the relays 110a through 110h, which causes the relays 110a through 110h receiving the OFF state signals to be configured in the OFF state, during operation of the battery charger system 100. The controller 114 provides the ON state signals and the OFF state signals to the relays 110a through 110h through one or more relay signal lines 116. The relay signal lines 116 may be manifested as wires, traces in a printed circuit board, or optical fibers, for example. Alternatively, the one or more relay signal lines 116 may be manifested by wireless transmission channels or terahertz conduits.

Each power channel 102a through 102h includes a current sensor 118a through 118h, respectively. The current sensors 118a through 118h may be manifested as step-down transformer current sensors in series between the power input port 112 and the respective relay 110a through 110h, as depicted schematically in FIG. 1. Alternatively, the current sensors 118a through 118h may be manifested as inductive pickup sensors, series resistors with differential voltage taps, or Hall effect magnetic sensors, for example. The current sensors 118a through 118h are configured to provide sensor signals to the controller 114 that correspond to the currents flowing through the respective power outlets 104a through 104h during operation of the battery charger system 100.

Each power channel 102a through 102h may optionally include a filter 120a through 120h coupled between the respective current sensor 118a through 118h and the controller 114 to condition the sensor signals. The filters 120a through 120h may be manifested as low pass filters, as indicated schematically in FIG. 1, with corner frequencies lower than frequencies of the currents through the power channels 102a through 102h. The currents through the power channels 102a through 102h commonly have frequencies of 60 hertz (Hz), or optionally 50 Hz, and the filters 120a through 120h may have corner frequencies less than 5 Hz, reducing oscillations in the sensor signals.

The controller 114 may be located in a same package as the relays 110a through 110h and the current sensors 118a through 118h. In such a case, the controller 114 may be manifested as a Rabbit microcontroller, an Arduino microcontroller, a Raspberry Pi microcomputer, or other programmable controller. Alternatively, the controller 114 may be implemented as a computer program and may be located in a computer, connected to the relays 110a through 110h and the current sensors 118a through 118h through a communication channel, such as a broadband cable or a wireless channel.

FIG. 2A through FIG. 2E schematically depict an aspect of an example method of the battery charger system 100 providing power to battery charger 106e through power channel 102f of FIG. 1. The controller 114 of FIG. 1 is configured to execute the steps disclosed in this aspect, and in reference to FIG. 2A through FIG. 2E. In this aspect, the battery charger system 100 has seven battery chargers 106a through 106g connected to the power outlets 104a through 104d and 104f through 104h, with six batteries 108a through 108f, as shown in FIG. 1. Relays 110a through 110c are in the ON state, as indicated in FIG. 1, and battery chargers 106a, 106b, and 106c are drawing current to charge batteries 108a, 108b, and 108c of FIG. 1. Referring to FIG. 2A, at the start of the method of this aspect, relay 110f is in the OFF state. Battery charger 106e with battery 108d is connected to relay 110f through power outlet 104f. The controller 114 of FIG. 1 generates a first total current estimate through the power channels 102a through 102h. The first total current estimate is determined by estimates of currents drawn by the three battery chargers 106a, 106b, and 106c, as indicated in a chart 122a of the first total current estimate. The first total current estimate is less than the maximum current limit, as indicated in chart 122a. In one version of this aspect, the first total current estimate may be less than a threshold current limit, as indicated in FIG. 2A. The threshold current limit is less than the maximum current limit. In another version, the first total current estimate may be more than the threshold current limit.

Referring to FIG. 2B, the controller 114 provides the on-state signal to the relay 110f, causing the relay 110f to be configured in the ON state, connecting the power input port 112 of FIG. 1 to the battery charger 106e with the battery 108d. The battery charger 106e draws current through the power channel 102f. The controller 114 generates a second total current estimate which is greater than the maximum current limit, as indicated in chart 122b.

Referring to FIG. 2C, the controller 114 compares the second total current estimate to the maximum current limit. Because the second total current estimate is greater than the maximum current limit, the controller 114 provides the off-state signal to the relay 110f, causing the relay 110f to be configured in the OFF state, stopping current from the power input port 112 to the battery charger 106e. The relays 110a, 110b, and 110c are left in the ON state. The controller 114 provides the off-state signal to the relay 110*f* less than 1 second after providing the on-state signal to the relay 110*f*, as disclosed in reference to FIG. 2B, to avoid tripping a circuit breaker controlling current to the battery charger system 100. The controller 114 generates a third total current estimate which is less than the maximum current limit, as indicated in chart 122*c*. The third total current estimate may be substantially equal to the second total current estimate, within current variations drawn by battery chargers, as a result of the short time intervals, that is, less than 1 second, between providing the on-state signal to the relay 110*f* and subsequently providing the off-state signal to the relay 110*f*.

Referring to FIG. 2D, at a later time, for example, 1 minute to 10 minutes later, the currents drawn by the three battery chargers 106*a*, 106*b*, and 106*c* lessen, as a result of the batteries 108*a*, 108*b*, and 108*c* becoming partially or completely charged. The controller 114 generates a fourth total current estimate which is less than the threshold current limit, as indicated in chart 122*d*. The controller 114 may generate multiple total current estimates between the third total current estimate and the fourth total current estimate, as a result of the controller 114 receiving the sensor signals from the current sensors 118*a* through 118*h* and generating new total current estimates, multiple times each second.

Referring to FIG. 2E, the controller 114 compares the fourth total current estimate to the threshold current limit. Because the fourth total current estimate is less than the threshold current limit, the controller 114 provides the on-state signal to the relay 110*f*, causing the relay 110*f* to be configured in the ON state, connecting the power input port 112 of FIG. 1 to the battery charger 106*e* with the battery 108*d*. The battery charger 106*e* draws current through the power channel 102*f*. After the relay 110*f* is configured in the ON state, the controller 114 generates a fifth total current estimate which is less than the maximum current limit, as indicated in chart 122*e*. The controller 114 compares the fifth total current estimate to the maximum current limit. Because the fifth total current estimate is less than the maximum current limit, the relay 110*f* is left in the ON state, allowing the battery charger 106*e* to charge the battery 108*d*.

FIG. 3A through FIG. 3D schematically depict another aspect of an example method of the battery charger system 100 providing power to battery chargers 106*g* and 106*h* of FIG. 1. The controller 114 of FIG. 1 is configured to execute the steps disclosed in this aspect, and in reference to FIG. 3A through FIG. 3D. In this aspect, the battery charger system 100 has seven battery chargers 106*a* through 106*g* connected to the power outlets 104*a* through 104*d* and 104*f* through 104*h*, with five batteries 108*a* through 108*e*, as shown in FIG. 1. In this aspect, relays 110*a*, 110*b*, 110*c*, and 110*f* are in the ON state, and battery chargers 106*a*, 106*b*, 106*c*, and 106*e* are drawing current to charge batteries 108*a*, 108*b*, 108*c*, and 108*d*. Relays 110*d*, 110*e*, 110*g*, and 110*h* are in the OFF state. Battery charger 106*f* with battery 108*e* is coupled to relay 110*g*. Battery charger 106*g* with battery 108*f* is coupled to relay 110*h*.

Figure 3A:
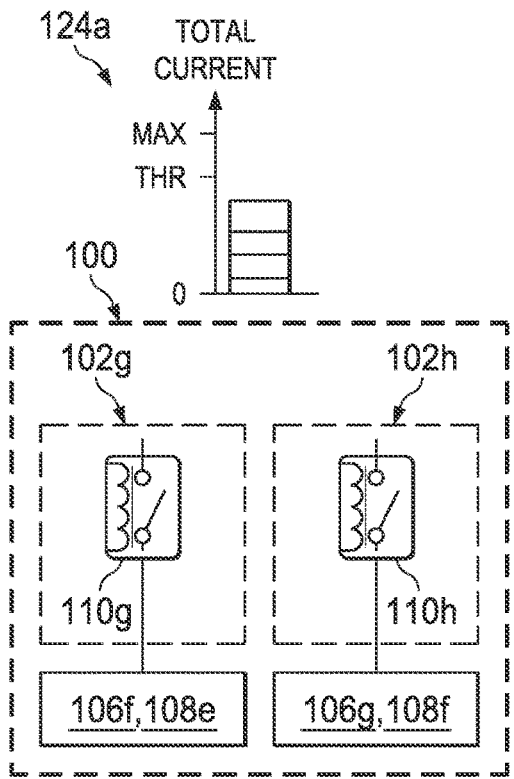
FIG. 3A through FIG. 3D schematically depict another aspect of an example method of the battery charger system providing power to battery chargers.

Referring to FIG. 3A, at the start of the method of this aspect, the controller 114 of FIG. 1 generates a first total current estimate through the power channels 102*a* through 102*h*. The first total current estimate is determined by estimates of currents drawn by the four battery chargers 106*a*, 106*b*, 106*c*, and 106*e*, as indicated in a chart 124*a* of the first total current estimate. The first total current estimate is less than the maximum current limit, as indicated in chart 124*a*. In one version of this aspect, the first total current estimate may be less than the threshold current limit, as indicated in FIG. 3A. In another version, the first total current estimate may be more than the threshold current limit.

Figure 3B:
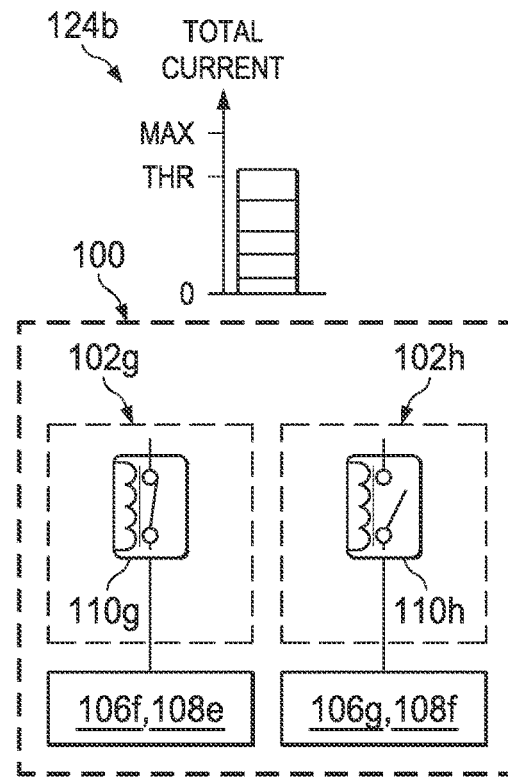

Referring to FIG. 3B, because the first total current estimate is less than the maximum current limit, the controller 114 provides the on-state signal to the relay 110*g*, causing the relay 110*g* to be configured in the ON state, connecting the power input port 112 of FIG. 1 to the battery charger 106*f* with the battery 108*e*. The battery charger 106*f* draws current through the power channel 102*g*. The controller 114 generates a second total current estimate which is less than the maximum current limit, as indicated in chart 124*b*.

Figure 3C:
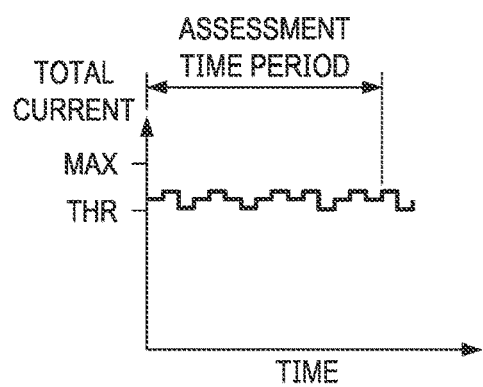

Referring to FIG. 3C, the controller 114 generates multiple total current estimates during an assessment time period. The assessment time period is sufficiently long to enable a reliable assessment of a range of the total current. The assessment time period may be 5 seconds to 60 seconds, by way of example. The controller 114 compares the total current estimates during the assessment time period to the maximum current limit. If the total current estimates are less than the maximum current limit, as indicated in FIG. 3C, relay 110*g* is left in the ON state.

Figure 3D:
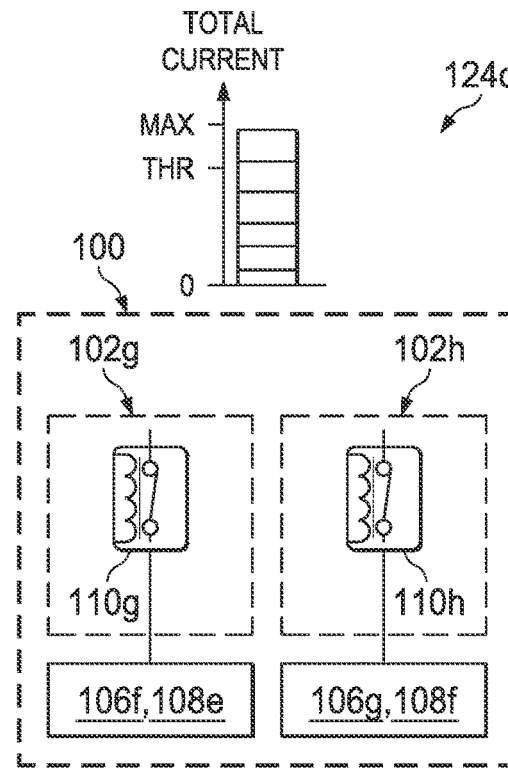

Referring to FIG. 3D, after the assessment time period of FIG. 3C is over, and the total current estimates are less than the maximum current limit, the controller 114 provides the on-state signal to the relay 110*h*, causing the relay 110*h* to be configured in the ON state, connecting the power input port 112 of FIG. 1 to the battery charger 106*g* with the battery 108*f*. The battery charger 106*g* draws current through the power channel 102*h*. The controller 114 generates a third total current estimate, which may be less than the maximum current limit, as indicated in chart 124*c*.

The method disclosed in reference to FIG. 3A through FIG. 3D, that is, connecting the power input port to a first new battery charger, comparing the total current estimates during the assessment time period to the maximum current limit, and then connecting the power input port to a second new battery charger, may advantageously enable concurrent charging of a plurality of batteries while maintaining the total current below the maximum current limit.

Figure 4:
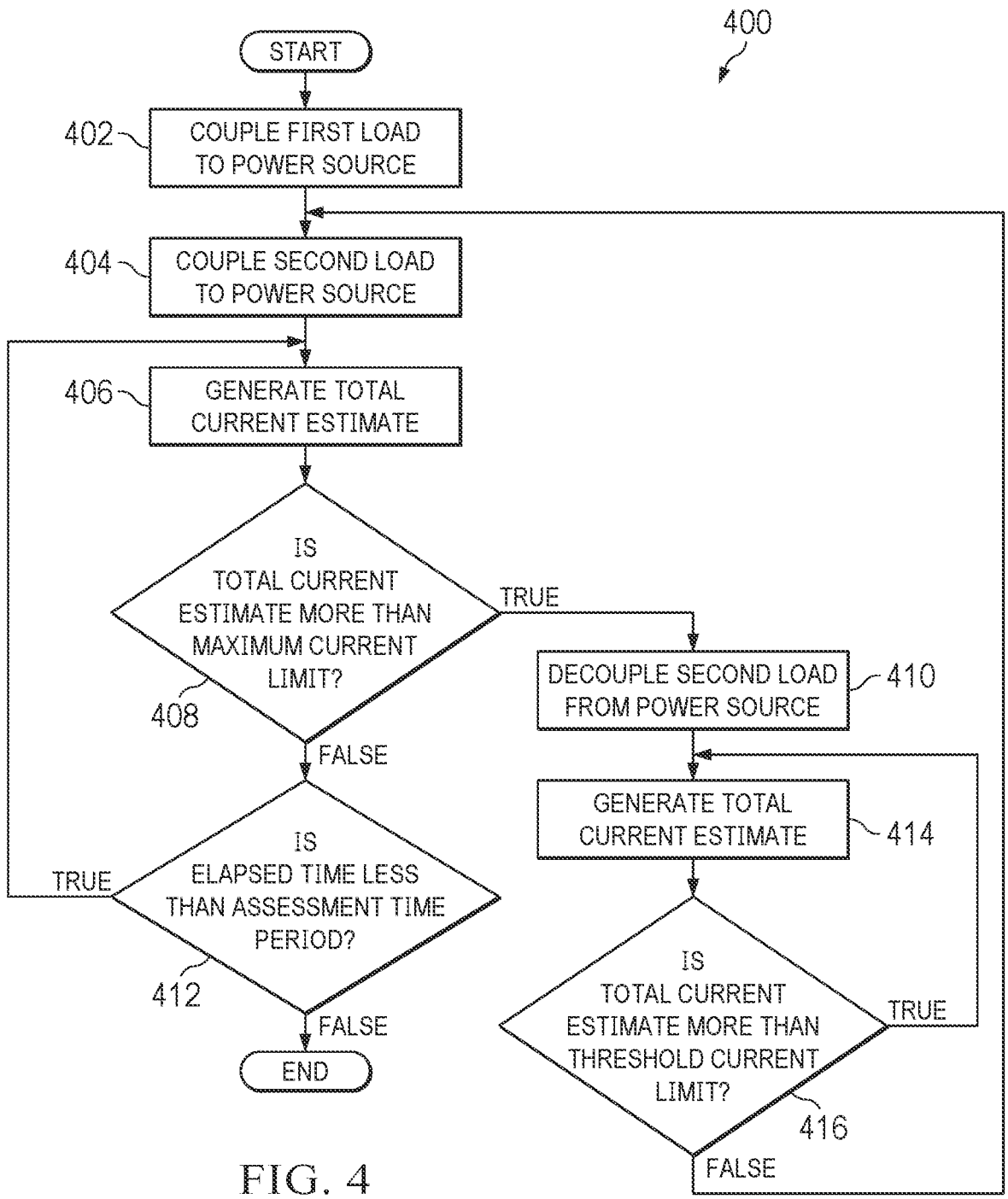
FIG. 4 is a flowchart of an example method of charging multiple batteries using a battery charger system.

FIG. 4 is a flowchart of an example method of charging multiple batteries using a battery charger system. The battery charger system 100 of FIG. 1 is configured to execute the steps disclosed in reference to FIG. 4. The method 400 begins with step 402, which is to couple a first load to a power source. For the battery charger system 100 of FIG. 1, step 402 may be implemented by the controller 114 providing the on-state signal to relay 110*a*, causing relay 110*a* to be configured in the ON state. When relay 110*a* is configured in the ON state, battery charger 106*a* is coupled to the power input port 112, and battery 108*a* begins charging, drawing current through the power channel 102*a*.

The method continues with step 404, which is to couple a second load to the power source, while the first load is coupled to the power source. For the battery charger system 100, step 404 may be implemented by the controller 114 providing the on-state signal to relay 110*b*, causing relay 110*b* to be configured in the ON state, while relay 110*a* is configured in the ON state. When relay 110*b* is configured in the ON state, battery charger 106*b* is coupled to the power input port 112, and battery 108*b* begins charging, drawing current through the power channel 102*b*.

The method continues with step 406, which is to generate a total current estimate of a total current through the battery charger system. For the battery charger system 100, step 406 may be implemented by the current sensors 118*a* through 118*h* providing sensor signals to the controller 114. The sensor signals correspond to currents through the power channels 102*a* through 102*h*. The controller 114 generates the total current estimate using the sensor signals. In one implementation of step 406, the controller 114 may generate channel current estimates of currents through each of the power channels 102*a* through 102*h* using the sensor signals from the respective current sensors 118*a* through 118*h*, and adding the channel current estimates to generate the total current estimate. In another implementation, the controller 114 may add the channel current estimates and add an estimate of current consumed by the controller 114 to generate the total current estimate. Other methods of generating the total current estimate are within the scope of this example.

The method continues with step 408, which is a decision step. The controller 114 compares the total current estimate generated in step 406 to the maximum current limit. If the total current estimate is more than the maximum current limit, the method branches to step 410. If the total current estimate is not more than the maximum current limit, the method branches to step 412.

Step 410 is executed if the total current estimate is more than the maximum current limit, as resolved in step 408. In step 410, the second load is decoupled from the power source. For the battery charger system 100, step 410 may be implemented by the controller 114 providing the off-state signal to relay 110*b*, causing relay 110*b* to be configured in the OFF state, while relay 110*a* is configured in the ON state. When relay 110*b* is configured in the OFF state, battery charger 106*b* is decoupled from the power input port 112, and battery 108*b* ceases charging. Current through the power channel 102*b* drops to essentially zero.

Following step 410, the method continues with step 414, which is to generate a new total current estimate of a total current through the battery charger system. For the battery charger system 100, step 414 may be implemented as disclosed in reference to step 406. Step 414 may include a delay of a few milliseconds to 1 second, to enable other operations to be executed by the battery charger system.

Following step 414, the method continues with step 416, which is a decision step. The controller 114 compares the new total current estimate generated in step 414 to the threshold current limit. If the new total current estimate is more than the threshold current limit, the method branches back to step 414. If the total current estimate is not more than the threshold current limit, the method branches back to step 404. Thus, steps 404, 406, 408, 410, 414, and 416 combine to provide current to the second load while maintaining the total current estimate below the maximum current limit.

Step 412 is executed if the total current estimate is not more than the maximum current limit, as resolved in step 408. Step 412 is a decision step. The controller 114 compares the time elapsed since step 408 was completed to the assessment time period; the assessment time period is disclosed in reference to FIG. 3C. If the time elapsed since step 408 was completed is less than the assessment time period, the method branches back to step 406. If the time elapsed since step 408 was completed is not less than the assessment time period, the method terminates, leaving the second load connected to the power source.

The method of FIG. 4 may be sequentially repeated with additional loads coupled to additional power channels of the battery charger system 100. The method of FIG. 4 may thus provide current to the all the loads coupled to the battery charger system 100 while maintaining the total current estimate below the maximum current limit, without need for user interaction after the loads are initially coupled to the battery charger system 100.

Figure 5A:
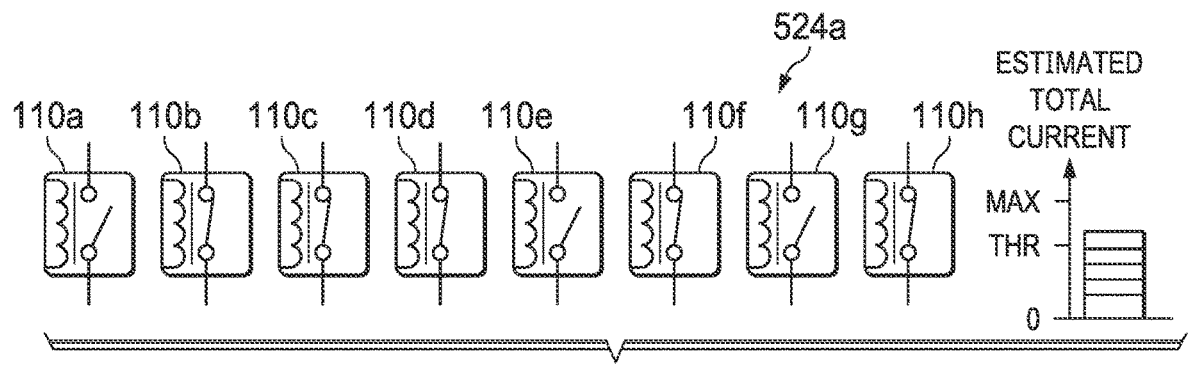
FIG. 5A through FIG. 5J schematically depict a further aspect of an example method of the battery charger system providing power to battery chargers.

FIG. 5A through FIG. 5J schematically depict a further aspect of an example method of the battery charger system 100 providing power to battery chargers 106*g* and 106*h* of FIG. 1. The battery charger system 100 of FIG. 1 is configured to execute the steps disclosed in reference to FIG. 5A through FIG. 5J. In this example, battery chargers with batteries are coupled to all of the power channels 102*a* through 102*h* of the battery charger system 100. Referring to FIG. 5A, relays 110*b*, 110*c*, 110*d*, 110*f*, and 110*h* are configured in the ON state. Relays 110*a*, 110*e*, and 110*g* are configured in the OFF state. Current flows through relays 110*b*, 110*c*, 110*d*, 110*f*, and 110*h*, while essentially no current flows through relays 110*a*, 110*e*, and 110*g*. A total current estimate, generated by the controller 114 of FIG. 1, is less than the maximum current limit, as indicated in the current chart 524*a*.

Figure 5B:
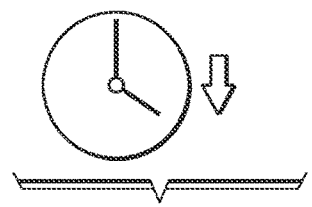

Referring to FIG. 5B, at a first defined time, a first sequential sweep of relays in the OFF state is executed, in which the controller 114 provides the on-state signal to the relays that are in the OFF state at the first defined time, in sequence. The first sequential sweep is depicted in FIG. 5C through FIG. 5F.

Figure 5C:
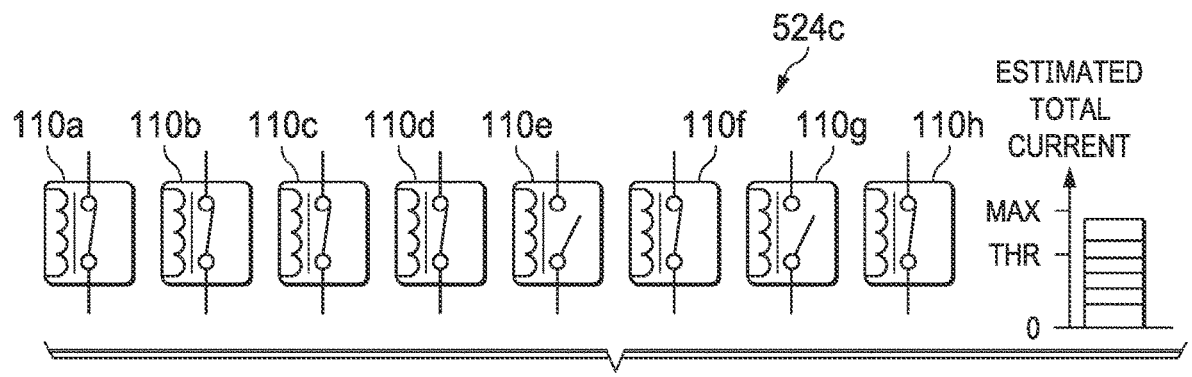

Referring to FIG. 5C, the controller 114 provides the on-state signal to the first relay in the OFF state, in this case, relay 110*a*. The on-state signal causes relay 110*a* to be configured in the ON state, and current flows through relay 110*a* to the battery charger coupled to relay 110*a*. The total current estimate increases, but remains less than the maximum current limit, as indicated in the current chart 524*c*. Relay 110*a* is left in the ON state. Relay 110*a* may be left in the ON state for the assessment time period, as disclosed in reference to FIG. 3C and steps 408 and 412 of FIG. 4, before proceeding to the next relay in the OFF state, while the total current estimate is updated and monitored to establish the total current estimate is less than the maximum current limit.

Figure 5D:
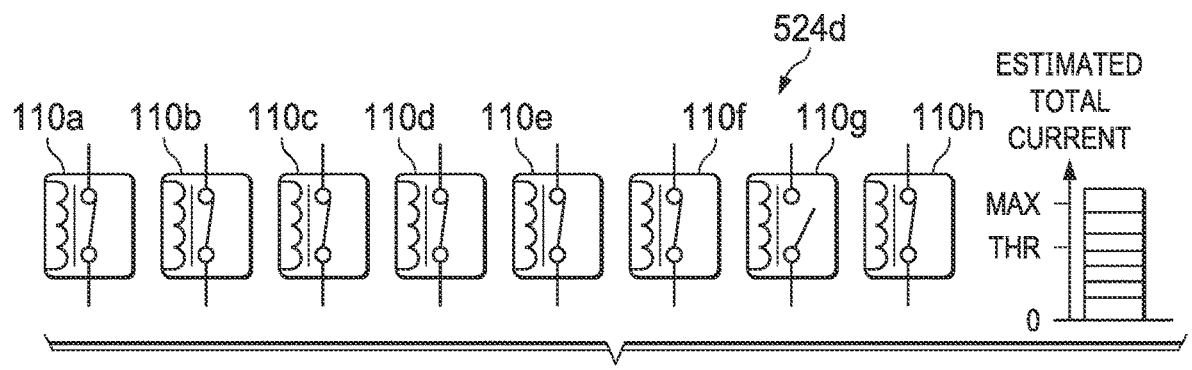

Referring to FIG. 5D, the controller 114 provides the on-state signal to the next relay in the OFF state, in this case, relay 110*e*. The on-state signal causes relay 110*e* to be configured in the ON state, and current flows through relay 110*e* to the battery charger coupled to relay 110*e*. The total current estimate increases, and is now more than the maximum current limit, as indicated in the current chart 524*d*.

Figure 5E:
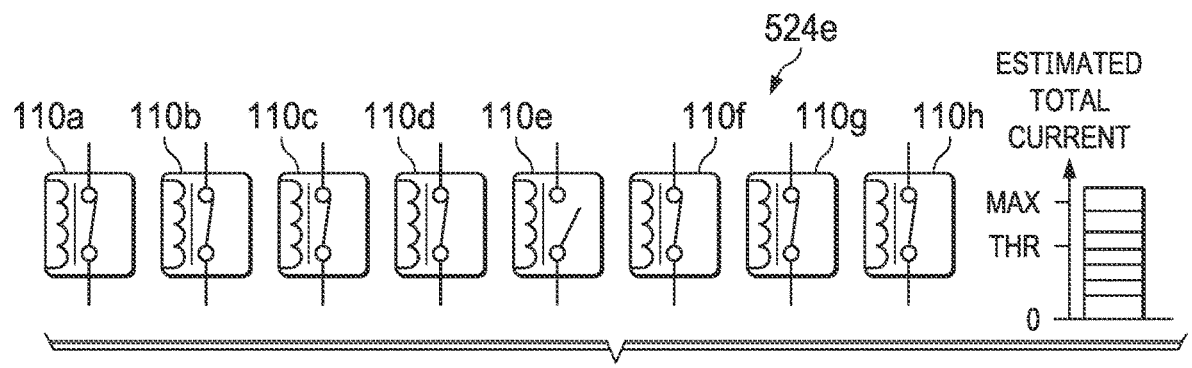

Referring to FIG. 5E, because the total current estimate is more than the maximum current limit, the controller 114 provides the off-state signal to the last relay to receive the on-state signal, in this case, relay 110*e*. The off-state signal causes relay 110*e* to be configured in the OFF state. Current through relay 110*e* drops to essentially zero, and the total current estimate drops below the maximum current limit.

The controller 114 subsequently provides the on-state signal to the next relay in the OFF state, in this case, relay 110*g*. The on-state signal causes relay 110*g* to be configured in the ON state, and current flows through relay 110*g* to the battery charger coupled to relay 110*g*. The total current estimate increases, and is now more than the maximum current limit, as indicated in the current chart 524*e*.

Figure 5F:
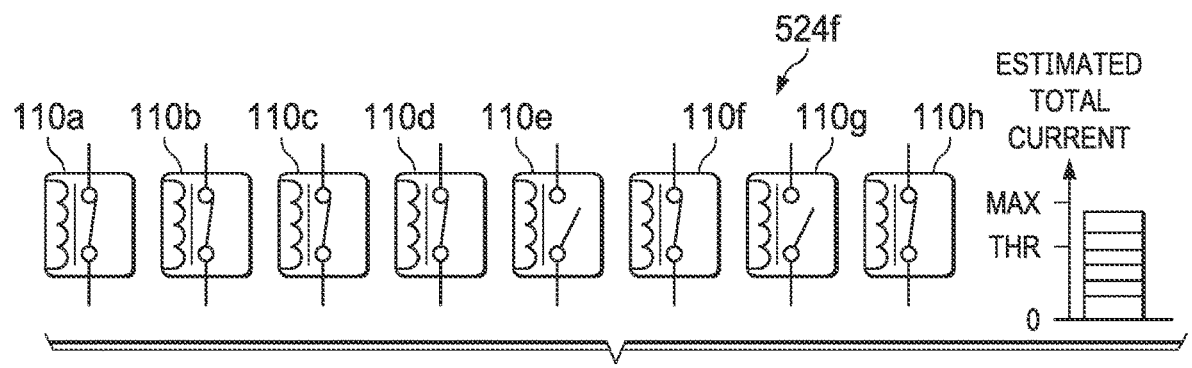

Referring to FIG. 5F, because the total current estimate is more than the maximum current limit, the controller 114 provides the off-state signal to the last relay to receive the on-state signal, in this case, relay 110*g*. The off-state signal causes relay 110*g* to be configured in the OFF state. Current through relay 110*g* drops to essentially zero, and the total current estimate drops below the maximum current limit, as indicated in the current chart 524f.

The first sequential sweep is completed. The relays that were in the OFF state at the beginning of the first sequential sweep have been sequentially configured in the ON state. The relays that were configured in the ON state, and resulted in the total current estimate staying below the maximum current limit, in this case, relay 110a, were left in the ON state. The total current estimate was maintained below the maximum current limit, by providing the off-state signal to the last relays to receive the on-state signal, when the total current estimate rose above the maximum current limit.

Figure 5G:
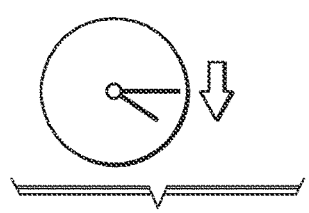

Referring to FIG. 5G, at a second defined time, a second sequential sweep of relays in the OFF state is executed, in which the controller 114 provides the on-state signal to the relays that are in the OFF state at the second defined time, in sequence. The first defined time and the second defined time may be separated by a sweep iteration period, such as 10 minutes to 30 minutes. During the time between the first defined time and the second defined time, the battery chargers that are connected may draw less current, as the batteries become partially or fully charged, providing current capacity to connect one or more relays that are in the OFF state. The second sequential sweep is depicted in FIG. 5H through FIG. 5J.

Figure 5H:
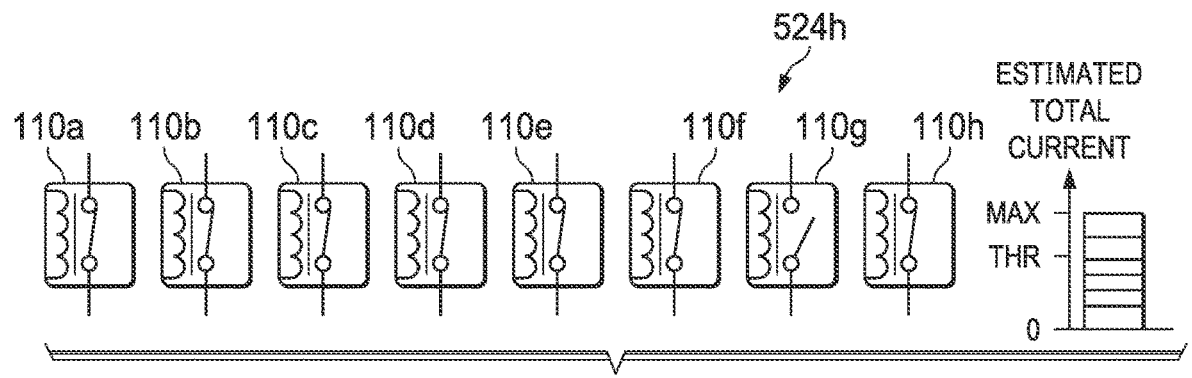

Referring to FIG. 5H, the controller 114 provides the on-state signal to the first relay in the OFF state, in this case, relay 110e. The on-state signal causes relay 110e to be configured in the ON state, and current flows through relay 110e to the battery charger coupled to relay 110e. The total current estimate increases, but remains less than the maximum current limit, as indicated in the current chart 524h. Relay 110e is left in the ON state. Relay 110e may be left in the ON state for the assessment time period, before proceeding to the next relay in the OFF state, as disclosed in reference to FIG. 5C.

Figure 5I:
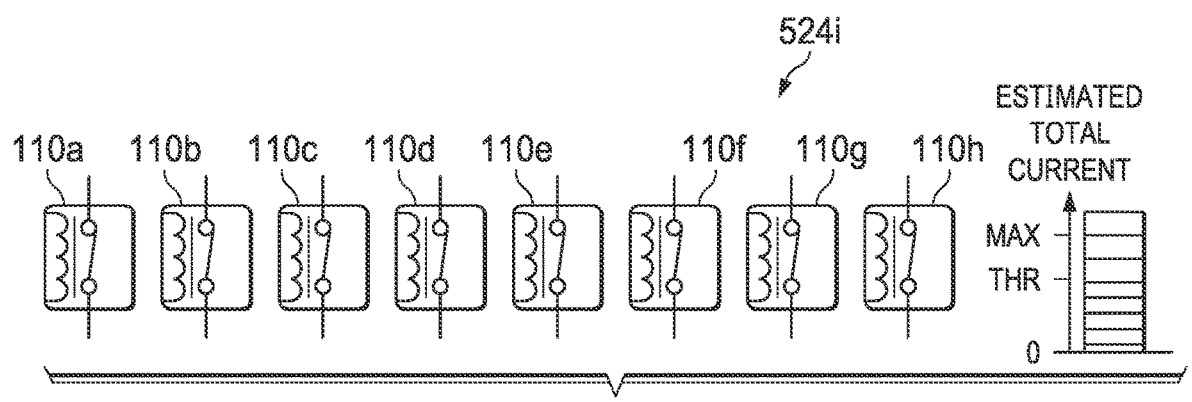

Referring to FIG. 5I, the controller 114 provides the on-state signal to the next relay in the OFF state, in this case, relay 110g. The on-state signal causes relay 110g to be configured in the ON state, and current flows through relay 110g to the battery charger coupled to relay 110g. The total current estimate increases, and is now more than the maximum current limit, as indicated in the current chart 524i.

Figure 5J:
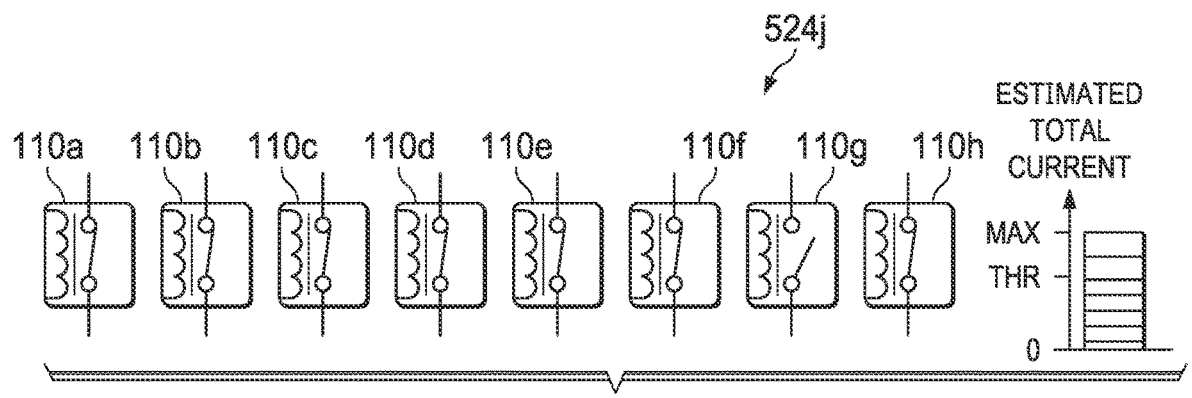

Referring to FIG. 5J, because the total current estimate is more than the maximum current limit, the controller 114 provides the off-state signal to the last relay to receive the on-state signal, in this case, relay 110g. The off-state signal causes relay 110g to be configured in the OFF state. Current through relay 110g drops to essentially zero, and the total current estimate drops below the maximum current limit, as indicated in the current chart 524j.

The second sequential sweep is completed. The relays that were in the OFF state at the beginning of the second sequential sweep have been sequentially configured in the ON state. The relays that were configured in the ON state, and resulted in the total current estimate staying below the maximum current limit, in this case, relay 110e, were left in the ON state. The total current estimate was maintained below the maximum current limit by providing the off-state signal to the last relays to receive the on-state signal, when the total current estimate rose above the maximum current limit.

Sequential sweeps may be repeated at defined times separated by the sweep iteration period, to efficiently charge batteries while maintaining the total current estimate below the maximum current limit. As batteries on battery chargers coupled to the battery charger system 100 are charged, current to the batteries reduces, enabling more relays to be configured in the ON state and remain in the ON state during the sequential sweeps, culminating in all the batteries being charged, advantageously without requiring user interaction.

Figure 6:
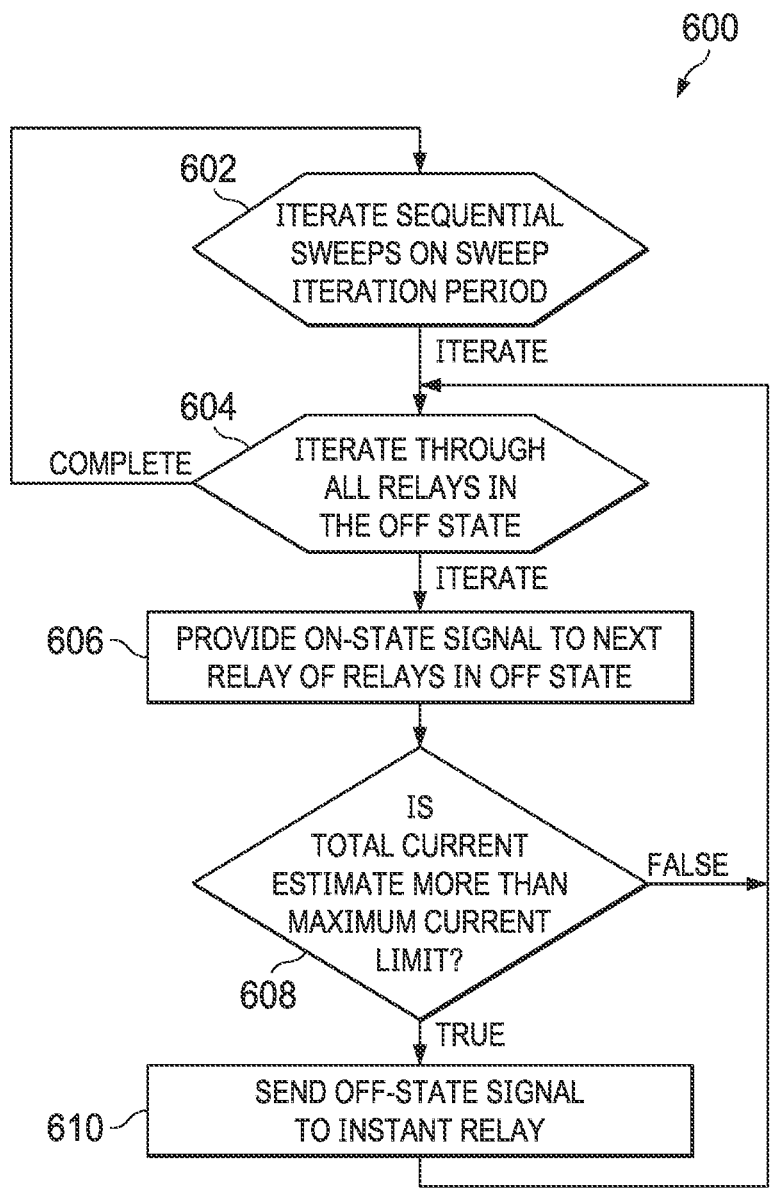
FIG. 6 is a flowchart of the method disclosed in reference to FIG. 5A through FIG. 5J.

FIG. 6 is a flowchart of the method disclosed in reference to FIG. 5A through FIG. 5J. The method 600 begins with step 602 which is to iterate sequential sweeps of the relays 110a through 110h that are in the OFF state. The sequential sweeps are iterated at defined times separated by the sweep iteration period. In each iteration, steps 604 through 608 are executed, and step 610 may be executed.

The first step in each iteration of the sequential sweeps is step 604, which is to iterate through all the relays in the OFF state. The relays may be addressed in numerical sequence, or in another order.

For each relay being addressed, the first step in the sequential sweep is step 606, which is to provide the on-state signal to next relay of the relays in the OFF state. The relay receiving the on-state signal becomes configured in the ON state. If a load, for example a battery charger with a battery, is coupled to the relay in the ON state, current will flow through the relay to the load.

Following step 606, step 608 is executed, which is a decision step. In step 608 a total current estimate through the battery charger system is compared to the maximum current limit. The total current estimate is generated by the controller 114 of FIG. 1, using the sensor signals from the current sensors 118a through 118h. If the total current estimate is more than the maximum current limit, the method branches to step 610. If the total current estimate is not more than the maximum current limit, the relay that was turned on in step 608 is left in the ON state, and the method branches back to step 604. The relay may be left in the ON state for the assessment time period, as disclosed in reference to FIG. 3C and steps 408 and 412 of FIG. 4, before proceeding to step 604, while the total current estimate is updated and monitored to establish the total current estimate is less than the maximum current limit.

Step 610 is executed if the total current estimate is more than the maximum current limit, as determined in decision step 608. In step 610, the last relay that was provided with the on-state signal is now provided with the off-state signal, causing the relay to be configured in the OFF state. Thus, the total current estimate is maintained below the maximum current limit, advantageously without requiring user interaction.

In one version of this example, the iterations of the sequential sweeps as disclosed in reference to step 602 may be executed a fixed number of times. In another version, the iterations of the sequential sweeps may be executed until all the relays are in the ON state. In a further version, the iterations of the sequential sweeps may be executed continuously while the battery charger system is operating.

While various embodiments of the present disclosure have been described above, it should be understood that they have been presented by way of example only and not limitation. Numerous changes to the disclosed embodiments can be made in accordance with the disclosure herein without departing from the spirit or scope of the disclosure. Thus, the breadth and scope of the present invention should not be limited by any of the above described embodiments. Rather, the scope of the disclosure should be defined in accordance with the following claims and their equivalents.

What is claimed is:

1. A power control system comprising:
a plurality of power ports;

a plurality of relays for each respective one port of the plurality of power ports, each relay of the plurality of relays independently changeable between an ON state, where power is supplied to the respective one port, and an OFF state, where power is not supplied to the respective port;

a plurality of current sensors for each respective one port of the plurality of power ports, each current sensor of the plurality of current sensors operable to measure an electrical current at the respective one port;

a controller operable to perform a sequential sweep by performing the steps (a) through (e) below, sequentially for a set of OFF state relays, the set of OFF set relays defined as relays, from the plurality of relays, that are in the OFF state, the set of OFF state relays being numbered sequentially from 1, and n is set to 1:

(a) providing the ON state signal to an n-th relay of the set of OFF state relays;

(b) determining whether, when the n-th relay is changed to the ON state, a total current estimate, determined as a sum of electrical current through all of the plurality of current sensors, is less than a maximum current limit;

(c) if the total current estimate is less than the maximum current limit, keeping the n-th relay provided with the ON state signal in the ON state;

(d) if the total current estimate is greater than the maximum current limit, then turning the n-th relay provided with the ON state signal in the OFF state;

(e) incrementing n to be n+1 and repeating steps (a) through (d) until the n-th relay is a final sequential relay of the set of OFF state relays; and repeating the sequential sweep at predetermined time intervals with remaining relays that are in the set of OFF state relays.

2. The power control system of claim 1, wherein one or more battery chargers are connected to respective ones of the plurality of power ports.

3. The power control system of claim 1, wherein the is configured to:

provide a first ON-state signal to a first relay of the plurality of relays;

provide a second ON-state signal to a second relay of the plurality of relays, while the first relay is in the ON state;

generate a first total current estimate of current through each of the current sensors, while the first relay is in the ON state and the second relay is in the ON state;

compare the first total current estimate to a maximum current limit;

provide an OFF-state signal to the second relay, when the first total current estimate is more than the maximum current limit;

subsequently generate a second total current estimate of current through each of the current sensors while the first relay is in the ON state and the second relay is in the OFF state;

compare the second total current estimate to a threshold current limit, the threshold current limit being less than the maximum current limit; and provide a third ON-state signal to the second relay, when the first relay is in the ON state, when the second total current estimate is less than the threshold current limit.

4. The power control system of claim 3, wherein the controller is configured to repetitively generate the second total current estimate and compare the second total current estimate to the maximum current limit for an assessment time period, before providing the second ON-state signal to the second relay.

5. The power control system of claim 4, wherein the controller is configured to provide the OFF-state signal to the first relay during the assessment time period, when the second total current estimate is more than the maximum current limit.

6. The power control system of claim 4, wherein the assessment time period is 5 seconds to 60 seconds.

7. The power control system of claim 3, wherein the controller is configured to generate the total current estimate at a rate greater than 10 times per second.

8. The power control system of claim 3, wherein the threshold current limit is 60 percent to 80 percent of the maximum current limit.

9. The power control system of claim 1, wherein, in step d), turning the n-th relay provided with the ON state signal is turned to the OFF state within 1 second.

10. The power control system of claim 1, wherein the controller is configured to initiate the sequential sweep at fixed intervals.

11. The power control system of claim 10, wherein the fixed intervals are 10 minutes to 60 minutes.

12. The power control system of claim 1, further comprising a filter electrically coupled between each of the plurality of current sensors and the controller.

13. The power control system of claim 12, wherein the filter is a low pass filter.

14. The power control system of claim 1, wherein the maximum current limit is 15 amps to 18 amps.

15. A power control system comprising:

a plurality of power ports;

a plurality of relays for each respective one port of the plurality of power ports, each relay of the plurality of relays independently changeable between an ON state, where power is supplied to the respective one port, and an OFF state, where power is not supplied to the respective port;

a plurality of current sensors for each respective one port of the plurality of power ports, each current sensor of the plurality of current sensors operable to measure an electrical current at the respective one port;

a controller configured to:

provide a first ON-state signal to a first relay of the plurality of relays; provide a second ON-state signal to a second relay of the plurality of relays, while the first relay is in the ON state;

generate a first total current estimate of current through each of the current sensors, while the first relay is in the ON state and the second relay is in the ON state;

compare the first total current estimate to a maximum current limit; when the first total current estimate is more than the maximum current limit, the controller is configured to: provide an OFF-state signal to the second relay; subsequently generate a second total current estimate of current through each of the current sensors while the first relay is in the ON state and the second relay is in the OFF state;

compare the second total current estimate to a threshold current limit, the threshold current limit being less than the maximum current limit; and provide a third ON-state signal to the second relay, when the first relay is in the ON state, when the second total current estimate is less than the threshold current limit; and when the first total current estimate is less than the maximum current limit, the controller is configured to: repetitively generate the first total current estimate and compare the first total current estimate to the maximum current limit for an assessment time period;

provide an ON-state signal to additional relays, one at a time, from the plurality of relays, after the assessment time period;

generate a third total current estimate of current through each of the current sensors, while the first relay is in the ON state, the second relay is in the ON state and the additional relays are in the ON state;

compare the third total current estimate to a maximum current limit; and when the third total current estimate is more than the maximum current limit, the controller is configured provide an OFF-state signal to one relay of the additional relays, the one relay being a last one to be turned to the ON state, wherein the controller is operable to perform a sequential sweep by performing the steps (a) through (e) below, sequentially for a set of OFF state relays, the set of OFF set relays defined as relays, from the plurality of relays, that are in the OFF state, the set of OFF state relays being numbered sequentially from 1, and n is set to 1:
  (a) providing the ON state signal to an n-th relay of the set of OFF state relays;
  (b) determining whether, when the n-th relay is changed to the ON state, a total current estimate, determined as a sum of electrical current through all of the plurality of current sensors, is less than a maximum current limit;
  (c) if the total current estimate is less than the maximum current limit, keeping the n-th relay provided with the ON state signal in the ON state;
  (d) if the total current estimate is greater than the maximum current limit, then turning the n-th relay provided with the ON state signal in the OFF state;
  (e) incrementing n to be n+1 and repeating steps (a) through (d) until the n-th relay is a final sequential relay of the set of OFF state relays; and repeating the sequential sweep at predetermined time intervals with remaining relays that are in the set of OFF state relays.

16. The power control system of claim 15, wherein the controller is configured to generate the total current estimate at a rate greater than 10 times per second.

17. The power control system of claim 15, wherein, in step d), turning the n-th relay provided with the ON state signal is turned to the OFF state within 1 second.

18. The power control system of claim 15, wherein the controller is configured to initiate the sequential sweep at fixed intervals.

19. The power control system of claim 18, wherein the fixed intervals are 10 minutes to 60 minutes.

* * * * *